Figure 1:
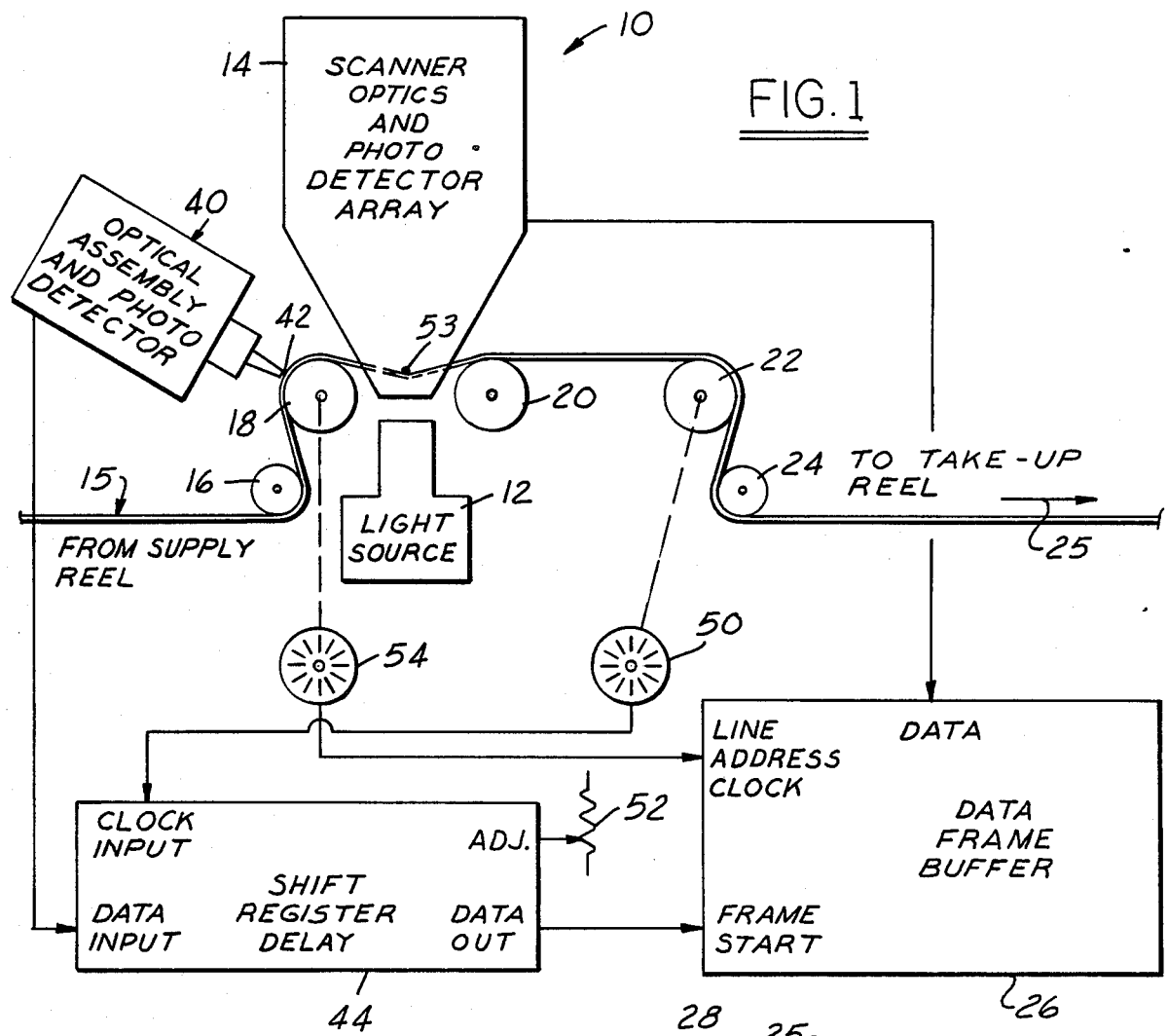

United States Patent [19]

Shearer

[11] Patent Number: 4,855,836

[45] Date of Patent: Aug. 8, 1989

[54] METHOD AND APPARATUS FOR CONVERTING FILM TO LINE SNYCHRONIZED VIDEO SIGNAL DATA

[75] Inventor: Thomas E. Shearer, Royal Oak, Mich.

[73] Assignee: Producers Color Service, Inc., Southfield, Mich.

[21] Appl. No.: 108,559

[22] Filed: Oct. 15, 1987

[51] Int. Cl.[4] .................. H04N 3/38; H04N 5/253
[52] U.S. Cl. .......................... 358/214; 358/54
[58] Field of Search ............... 358/214, 215, 216, 54

[56] References Cited

U.S. PATENT DOCUMENTS

| | | | |
|---|---|---|---|
| 3,663,750 | 5/1972 | Besier | 358/214 |
| 3,949,161 | 4/1976 | Fujishima et al. | 358/214 |
| 4,054,918 | 10/1977 | Kamogawa et al. | 358/214 |
| 4,319,280 | 3/1982 | Roos et al. | 358/214 |

*Primary Examiner*—James J. Groody
*Assistant Examiner*—Robert M. Bauer

*Attorney, Agent, or Firm*—Barnes, Kisselle, Raisch, Choate, Whittemore & Hulbert

[57] ABSTRACT

Apparatus and method for converting information recorded on film to video signal data in which the film is transported in the direction of its length between light source and scanner optics in which each film frame is scanned by lines and scan data is stored in a frame buffer. The storage operation is synchronized by frame through an electro-optical assembly which is positioned to detect passage of film sprocket apertures toward the scanning station, which apertures possess a predefined relationship to the frame edges in accordance with industry standards. A shift register delay is responsive to pulses from a film transport tachometer for selectively delaying the synchronization signal to the buffer, and thereby accommodating both separation of the synchronization optics from the scanning station and variations in film transport velocity. The frame buffer is clocked to store data by scan line through a second tachometer, which thus likewise automatically compensates for variations in film transport speed.

16 Claims, 1 Drawing Sheet

U.S. Patent    Aug. 8, 1989    4,855,836

METHOD AND APPARATUS FOR CONVERTING FILM TO LINE SNYCHRONIZED VIDEO SIGNAL DATA

The present invention is directed to conversion of image data recorded on film to video signal format, and more particularly to an apparatus and method for synchronizing the conversion process to eliminate video frame and scan line distortions.

Conventional apparatus for converting information stored by frame on film, particularly color negative motion picture film, includes a light source, scanner optics including a photodetector linear array, and a film transport for propelling the film in the direction of its length between the light source and the scanner optics. Each film frame is scanned by the detector array in a plurality of scan lines from frame top to bottom to develop a series of scan data lines for each frame. The scan line data is then fed to a memory for storage by scan line and frame, typically for later recording by line and frame on video tape.

Synchronization of data storage by scan line and frame is important for reducing distortion in the ultimate video image. In apparatus of the prior art, a sprocket roller has an array of teeth for engaging sprocket holes or apertures in the film strip, which apertures possess a predetermined positional relationship to the onset or leading edge of each image frame. This relationship depends upon film type and is specified by industry standards. However, differing film aperture geometries for differing film manufacturers and wear of the film sprocket apertures through use, lead to vertical framing position error from frame to frame and corresponding video frame distortion when the resulting video image is viewed on a monitor. Further, in apparatus of the prior art, a time based clock is provided for clocking scan line image data into memory. However, such time-based memory clocking arrangements do not account for or accommodate variations in film transport speed, with the result that scan lines within individual frames are not uniformly spaced, resulting in vertical linearity error within each frame.

It is a general object of the present invention to provide a method and apparatus for synchronizing storage of film frame image data which overcome the aforementioned deficiencies in prior art apparatus and techniques of the described character. More specific objects of the invention are to provide a method and apparatus for synchronizing storage of scan data by both frame and scan line which are more accurate than techniques heretofore proposed in the art, which may be readily employed through retrofit of existing film-to-video apparatus, and which are economical to implement both in such apparatus retrofit and in construction of new apparatus.

Figure 2:
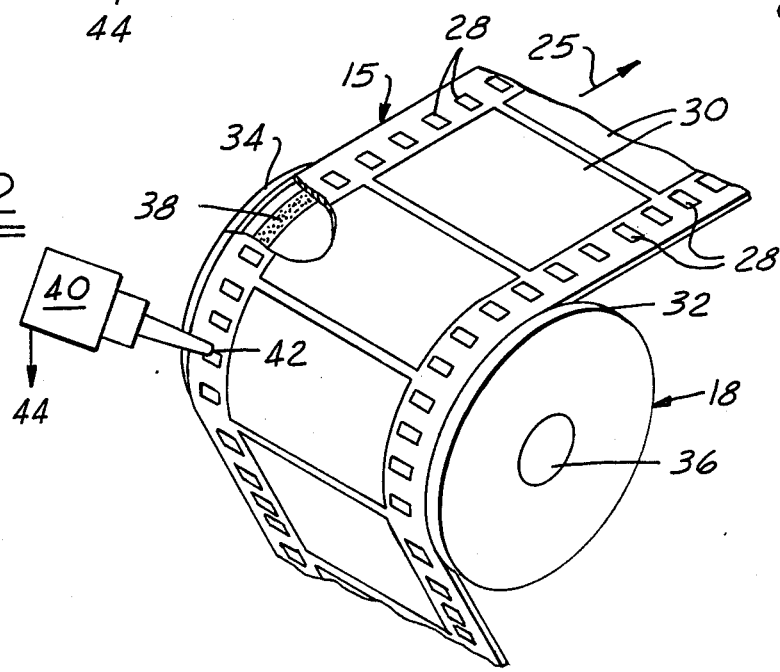

The invention, together with additional objects, features and advantages thereof, will be best understood from the following description, the appended claims and the accompanying drawing in which:

FIG. 1 is a functional block diagram of film-to-video transfer apparatus embodying frame and line synchronization in accordance with a presently preferred embodiment of the invention; and FIG. 2 is a perspective view on an enlarged scale of a portion of the film frame synchronization apparatus in the embodiment of FIG. 1.

FIG. 1 illustrates film-to-video image data transfer apparatus 10 in accordance with a presently preferred embodiment of the invention as comprising a light source 12 and opposed scanner optics 14 which includes a photodetector linear array and corresponding array scan control and data transmission electronics. Film is transported from a supply reel (not shown) around an idler roller 16, around a roller 18, between light source 12 and scanner optics 14, and thence around an idler roller 20, a film drive capstan 22 and an idler roller 24 to a film take-up reel (not shown). A data frame buffer 26 includes an electronic memory having a data input for receiving electronic signals from scanner optics 14 indicative of light intensity at each element of the scanner array, a frame start input for synchronizing data storage in buffer 26 to the onset or top edge of each frame at scanner optics 14, and a line address clock input for initiating and synchronizing storage of each scan data line within each frame.

To the extent thus far described, apparatus 10 corresponds to a Bosch FDL 60 Digital CCD Telecine marketed by Fernseh, Inc. In such prior art apparatus, the line address clock input to buffer 26 is driven by a real-time clock, and the frame start input to buffer 26 is driven by a sprocketed roller at 18 which engages and is thus responsive to position of the sprocket holes or openings 28 (FIG. 2) relative to the start of each image frame 30. In such apparatus, the content of buffer 26 is fed by frame to a color correction control computer, and thence to suitable means for recording corrected and processed video information onto video tape. Capstan 22, rollers 16, 18, 20 and 24, light source 12 and scanner optics 14 are all mounted in fixed position on a deck plate.

In accordance with the present invention, and referring to FIG. 2, roller 18 has a pair of guide ledges 32, 34 for laterally capturing and guiding film strip 15 therebetween, with the two series of sprocket apertures 28 thus being in predetermined positions laterally or axially of the bearing shaft 36 which mounts roller 18 to the deck plate. At least a portion of the roller surface underlying film strip 15—i.e., the strip 38 underlying the inboard array or series of sprocket apertures 28 adjacent to the deck plate—is of optically nonreflective construction. An electro-optical assembly 40 (FIGS. 1 and 2) is mounted on the deck plate adjacent to roller 18 for detecting passage of film apertures therepast. More specifically, assembly 40 is itself of generally conventional construction, and includes a source of polarized light energy and optics for focusing such light energy to a spot 42 at the surface of and at right angles to film strip 15 at a position to be incident upon the inboard series of sprocket apertures 28 as film strip 15 is transported therepast over roller 18. Electro-optical assembly 40 further includes a photodetector for detecting reflection characteristics from the film strip, specifically the leading edge of each sprocket aperture 28 as strip 15 is propelled in the direction 25, and for providing a corresponding synchronization signal to the data input of a shift register delay 44 (FIG. 1).

Thus, a synchronization signal is provided by electro-optical assembly 40 in response to detection of each inboard sprocket aperture 28 in film strip 15. The number and physical positioning of such sprocket apertures relative to each frame 30 are specified by industry standards as a function of film type. For example, for 35 mm film illustrated in FIG. 2, there are four apertures 28 on each side of film strip 15 for each frame 30, whereas there is only one aperture 28 on each side of strip 15 for each frame of 16 mm film. In a preferred embodiment of the invention, light energy radiated by and reflected onto electro-optical assembly 40 comprises red light generated by an HeNe laser, which facilitates visual observation during initial adjustment of the apparatus. Resolution depends in part upon the diameter of spot 42. A spot 42 which is 20 micrometers in diameter will yield 1/10 line resolution in a 525 line image frame, or 1/5250 resolution over the entire frame image.

Capstan 22, which is driven by the film drive motor (not shown) is coupled to a tachometer 50 which provides a series of pulses to the clock input of shift register delay 44 as a function of film transport speed. Shift register delay 44 also receives an adjustment input from an operator set-up control 52, and provides a synchronization output to the frame start input of data frame buffer 26. Thus, shift register delay 44 provides an adjustable delay to account for the distance in the direction 25 of film travel between frame edge detection at spot 42 opposite electro-optical assembly 40 and the onset of that frame at the scanning location 53 between optics 14 and light source 12. Such delay may be initially adjusted by the operator at 52. It will be appreciated, however, that operation of shift register delay 44 as a function of film motion through clock input from tachometer 50 provides automatic adjustment and accommodation for variations in film speed.

Roller 18 is also driveably coupled to a tachometer 54 which provides a line address clock input to buffer 26 as a function of increments of film strip motion corresponding separation between frame scan lines. That is, tachometer 54 clocks buffer 26 once for each image scan line. Upon receipt of each such line address clock input, the output of optics 14 is scanned and stored as a line of image data in buffer 26. Thus, once again, in accordance with the present invention, line scanning and image data storage at buffer 26 is controlled not by a fixed frequency clock functioning in the time domain, but by means directly responsive to film motion, and normal variations in film transport velocity are thereby automatically accommodated in the image data storage operation.

In summary, the preferred embodiment of the invention illustrated in the drawing and described in detail hereinabove provides two important advances over prior art apparatus of similar type. First, scanning and storage of each image frame is synchronized to the frame leading edge through optical detection of the sprocket aperture edges rather than physical engagement of the same with a sprocket roller. Frame-to-frame vertical framing position error is thereby greatly reduced, to a resolution of 1/10 line in the disclosed embodiment. Secondly, each line scanning and storage operation is clocked as a direct function of film motion past the scanning optics, thereby accommodating variations in film transport speed and reducing vertical linearity even within each frame.

The invention claimed is:

1. Apparatus for converting to video signal data information recorded in frames on a film strip that includes a series of apertures at predetermined positions lengthwise of the film strip physically synchronized with onset of information frames recorded therein, said apparatus comprising a light source, scanner optics positioned in opposition to said light source for generating image data signals, means for directing said film strip lengthwise along a predetermined path between said light source and said scanner optics, means for receiving said image data signals, and means responsive to motion of the film strip for synchronizing said signal-receiving means to the onset of each said frame, characterized in that said synchronizing means comprises electro-optical means positioned along said film path spaced from said scanner optics to direct light energy onto the film strip traveling in said path and responsive to passage of said apertures for producing a synchronizing signal indicating onset of an information frame between said light source and said scanner optics, means for directing said synchronizing signal to said receiving means to synchronize said receiving means, and means between said electro-optical means and said receiving means for delaying said synchronizing signal for a time corresponding to travel of the film strip from said electro-optical means to said scanner optics.

2. The apparatus set forth in claim 1 wherein said electro-optical means comprises a second light source for focusing light energy onto the film strip, guide means in said path for positioning the film strip with respect to said second light source such that the focused light energy is incident on said apertures, and means responsive to focused light energy reflected from said film strip for operating said synchronizing signals.

3. The apparatus set forth in claim 2 wherein said guide means comprises a guide roller adjacent to said second light source, and means positioned in said path for training the film strip over said guide roller between the surface thereof and said second light source, said surface being of optically nonreflective construction at least beneath apertures in said film strip illuminated by said second light source.

4. The apparatus set forth in claim 1 wherein said delaying means comprises means for generating motion signals as a function of motion of the film strip traveling in said path, and means for delaying said synchronizing signal as a function of said motion signals, such that timing of said synchronizing signal at said receiving means is automatically compensated for variations in film strip motion.

5. The apparatus set forth in claim 4 wherein said delay means includes means for adjusting said delay means as a function of film type.

6. The apparatus set forth in claim 1 wherein said signal-receiving means includes electronic memory means having a data input coupled to said scanner optics, a synchronizing input for receiving said synchronizing signal, and a clock input, and wherein said apparatus further comprises means positioned in said film path and coupled to the film strip in said path for generating clock signals as a function of increments of travel of the film strip along said path, and means for directing said clock signals to said clock input such that storage of said image data signals in said memory means is automatically compensated for variations in film strip motion.

7. Apparatus for converting information recorded in frames on film to video signal data comprising a light source, scanner optics positioned in opposition to said light source for generating image data signals as a series of scan data lines, means for directing a film strip lengthwise along a predetermined path between said light source and said scanner optics in a direction normal to said scan data lines, synchronizing means responsive to motion of said film strip for generating synchronizing signals at onset of each said image frame between said light source and scanner optics, electronic memory means having a data input for receiving said image data signals by scan data lines, a synchronizing input for receiving said synchronizing signals and a clock input for clocking signals at said data input by scan line into said memory means, and means for generating clock signals to said clock input, characterized in that said clock signal-generating means comprises means positioned in said film path and coupled to the film strip traveling in said path for generating said clock signals to said memory means as a function of increments of travel of the film strip along said path, such that storage of said data signals by scan data line in said memory means is automatically compensated for variations in film trip motion along said path.

8. The apparatus set forth in claim 7 wherein said synchronizing means comprises electro-optical means positioned to direct light energy onto said film strip for producing a synchronizing signal indicating onset of an information frame between said light source and said scanner optics, and means for directing said synchronizing signal to said synchronizing input of said memory means.

9. The apparatus set forth in claim 8 wherein the film strip includes a series of apertures at predetermined positions lengthwise of the film strip physically synchronized with onset of information frames recorded therein, and wherein said electro-optical means comprises means positioned to direct light energy onto the film strip traveling in said path and responsive to passage of said apertures for generating said synchronizing signals 10. In a method of converting image data stored in frames on film to video signals which includes the steps of (a) propelling the film lengthwise adjacent to image scanner means, (b) scanning each film frame in a plurality of scan lines from frame top to bottom to develop a series of scan line data, and (c) storing said scan line data in memory by line and frame, the improvement for automatically compensating storage of scan line data for variation in film speed comprising the step of (d) clocking storage of said scan line data as a function of film motion by (d1) sensing increments of lengthwise film motion and (d2) clocking said data as a function of said increments.

11. The method set forth in claim 10 comprising the additional steps of (e) sensing onset of each said image frame at said scanner means, and (f) synchronizing said storage of scan line data to onset of each said image frame.

12. Apparatus for converting to video signal data information recorded in frames on a film strip that includes a series of apertures at predetermined positions lengthwise of the film strip physically synchronized with onset of information frames recorded therein, said apparatus comprising a first light source, scanner optics positioned in opposition to said light source for generating image data signals, means for directing a film strip lengthwise along a predetermined path between said first light source and said scanner optics, means for receiving said image data signals, and means responsive to motion of said film strip for synchronizing said signal-receiving means to onset of each said frame, characterized in that said synchronizing means comprises a second light source for focusing light energy onto the film strip, a guide roller adjacent to said second light source, means positioned in said path for training the film strip over said guide roller between the surface thereof and said second light source such that the focused light energy is incident on the apertures in the film strip, said surface being of optically non-reflective construction at least beneath apertures in the film strip illuminated by said second light source, and means responsive to focused light energy reflected from said film strip for generating a synchronizing signal indicating onset of an information frame between said first light source and said scanner optics, and means for directing said synchronizing signal to said receiving means to synchronize said receiving means.

13. The apparatus set forth in claim 12 wherein said electro-optical means is positioned along said film path spaced from said scanner optics, and wherein said apparatus further comprises means between said electro-optical means and said receiving means for delaying said synchronizing signals for a time corresponding to travel of the film strip from said electro-optical means to said scanner optics.

14. In a method of converting image data stored in frames on film to video signals that includes the steps of (a) propelling the film lengthwise adjacent to image scanner means, (b) scanning each film frame in a plurality of scan lines from frame top to bottom to develop a series of scan line data, and (c) storing said scan line data in memory by line and frame, the improvement for automatically compensating storage of scan line data for variation in film speed comprising the steps of (d) clocking storage of said scan line data as a function of film motion, (e) sensing onset of each said image frame at said scanner means, and (f) synchronizing said storage of scan line data to onset of each said image frame.

15. The method set forth in claim 14 wherein said step (d) comprises the steps of (d1) sensing increments of lengthwise film motion and (d2) clocking said data as a function of sad increments.

16. The method set forth in claim 14 wherein said step (e) comprises the steps of (e1) sensing passage of each said image frame in the strip at a position spaced from said scanner means to develop a synchronizing signal, and (e2) delaying application of said synchronizing signal to said memory for a time duration which varies as a function of film strip velocity.

* * * * *